United States Patent [19]

Miura et al.

[11] Patent Number: 4,871,601
[45] Date of Patent: Oct. 3, 1989

[54] OPTICAL INFORMATION RECORDING CARRIER

[75] Inventors: Kyo Miura, Yokohama; Hiroyuki Sugata, Yamato; Yoshihiro Oguchi, Kawasaki; Hitoshi Yoshino, Tokyo, all of Japan

[73] Assignee: Canon Kabushiki Kaisha, Tokyo, Japan

[21] Appl. No.: 159,310

[22] Filed: Feb. 22, 1988

[30] Foreign Application Priority Data

Feb. 25, 1987 [JP] Japan ............................ 62-040415
Feb. 25, 1987 [JP] Japan ............................ 62-040419

[51] Int. Cl.⁴ ................................................ B32B 3/02
[52] U.S. Cl. ............................................ 428/64; 428/65;
428/68; 428/161; 428/172; 428/333; 428/334;
428/335; 428/411.1; 428/412; 428/414;
428/343; 428/480; 428/913; 346/76 L;
346/135.1; 369/283; 369/284; 369/286;
430/945

[58] Field of Search .................. 428/64, 65, 913, 68,
428/333, 334, 335, 161, 172, 411.1, 412, 500,
515, 516, 520, 414; 346/76 L, 135.1; 430/945;
369/283, 284, 286

[56] References Cited

U.S. PATENT DOCUMENTS 4,340,655  7/1982  Hollister et al. ................... 369/284
4,435,801  3/1984  Levin ................................ 369/284

FOREIGN PATENT DOCUMENTS 0045635  3/1983  Japan .
0090248  5/1984  Japan .
0197956  10/1985  Japan .

Primary Examiner—Ellis P. Robinson
Assistant Examiner—P. J. Ryan
Attorney, Agent, or Firm—Fitzpatrick, Cella, Harper & Scinto

[57] ABSTRACT

An optical information recording carrier comprises an optical recording layer provided on a transparent substrate, a film coating layer laminated with out adhesion on said optical recording layer, and further a fixing layer laminated thereon to fix said film coating layer.

14 Claims, 1 Drawing Sheet

OPTICAL INFORMATION RECORDING CARRIER

BACKGROUND OF THE INVENTION

1. Field of the Invention

This invention relates to an optical information recording carrier for performing optically recording and/or reproduction of information.

2. Related Background Art

In recent years, with the progress of information growth in society, there have been proposed many information recording carriers and devices for recording and reproducing information as means for handling a diversity of information with good efficiency. Such recording carriers may include those, in which the information is converted to binary values which can be detected by conversion to changes in reflectance, changes in intensity of the reflected light accompanied with the changes in the surface shape such as presence or absence of pit.

Among the recording carriers which depend on a change in optical reflectance, there have been proposed the so called heat mode recording materials, in which recording is effected by irradiating an energy beam such as laser beam in spots onto the recording layer to have a part of the recording layer undergo a change in state.

These recording materials are the so called DRAW (direct read after write) media in which it is not required to perform developing processing after writing of information, but which also afford high density recording as well as additional writing.

Among the recording-reproducing devices for optical informations, are systems in which grooves are preformed at certain intervals on the substrate surface thus providing a track servo for writing and reading. According to this system, the grooves play the role of a guide, and therefore track control precision of laser beam can be improved, whereby higher speed access results when compared with systems using grooveless substrate of the prior art.

FIG. 6 is a schematic sectional view of an optical information recording carrier of the closely contacted encapsulation type as described in the prior art. In FIG. 6, 1 is a transparent substrate made of a resin, 2 a track groove portion, 3 an optical recording layer, 4 an adhesive layer and 5 a protective substrate.

In FIG. 6, optical writing and reading are performed for recording and reproduction of information through the transparent substrate 1 and the track groove portion 2. By utilizing the fine unevenness of the track groove corresponding to the guide groove for light, tracking can be performed through the phase difference in the reflected light of the laser beam. Also, the optical information recording carrier of the closely contacted encapsulation type can be easily prepared obtained by forming an optical recording layer 3 on the track groove portion 2 of the transparent substrate 1 and plastering the protective substrate 5 through the adhesive layer thereon.

Such optical information recording carrier of the closely contacted encapsulation type as shown above in FIG. 6, has the drawback that it is generally lower in recording sensitivity as compared with an optical information recording carrier of the hollow structure type having, for example, an air layer (or space layer) provided therein. For example, in the case of the hollow structure type, the recording material constituting the optical recording layer is melted or sublimated by the light→heat conversion by light absorption to form recording pits, resulting in remarkable change in optical characteristics such as transmittance, reflectance, etc. at the recorded portion. In contrast, in the case of the closely contacted encapsulation type, the physical changes as mentioned above, namely the changes in shape such as pit formation, etc. through melting or sublimation are considerably inhibited, and instead thereof, chemical changes, for example, pyrolysis of the recording material constituting the optical recording layer through light→heat conversion by light absorption occurs to form recording pits by decoloration or discoloration, whereby a drawback results in that recording sensitivity is lowered due to change in optical characteristics such as transmittance, reflectance, etc. at the recorded portion.

SUMMARY OF THE INVENTION

An object of the present invention is to provide an optical information recording carrier of the closely contacted encapsulation type having overcome the problems exhibited by the optical information recording carrier of the prior art, namely improvement in recording contrast and recording sensitivity. That is, the optical information recording carrier according to the present invention comprises an optical recording layer provided on a transparent substrate, a film coating layer laminated without adhesion on said optical recording layer, and further a fixing layer laminated thereon to fix said film coating layer.

In the present invention, since no adhesion is effected between the optical recording layer and the film coating layer of the optical information recording center, a microscopic space layer may be considered to be formed, and due to the presence of such a microscopic space layer, pit formation by change in shape through melting or sublimation of the optical recording layer will not be obstructed.

For this reason, according to the present invention, a high sensitivity optical information recording carrier of the closely contacted encapsulation type improved in recording contrast can be obtained.

Japanese Laid-open Patent Application No. 197956/1985 discloses an invention in which an organic material having high heat resistance and capable of absorbing surface deformation of the recording layer is coated on the recording layer for the purpose of preventing deterioration of the recording layer to form an adhesive layer for adhering a protective substrate or preventing inhibition of formation of pit by change in shape of the recording head by close contact with the protective substrate in an optical information recording medium of the closely contacted encapsulation type. This invention has no space layer existing between the recording layer and the organic material layer, because an organic material layer is formed by coating.

On the other hand, the present invention has microscopic space layer existing between the recording layer and the film, because the layer provided on the recording layer is a film not adhered to the recording layer as described above, and therefore it differs from the invention as described above in that inhibition of pit formation due to change in shape of the recording layer is prevented by the space layer.

DETAILED DESCRIPTION OF THE PREFERRED EMBODIMENTS

Figure 1:
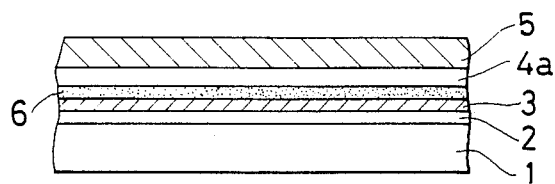
FIG. 1 is a schematic sectional view of an optical information recording carrier of the closely contacted encapsulation system according to the present invention.

FIG. 1 is a schematic sectional view of an optical information recording carrier (hereinafter written as optical recording carrier) of the close contact encapsulation type of the present invention, and FIG. 2 a sectional view showing an example of the whole constitution.

In the same Figure, 1 is a transparent substrate, 2 a track groove portion, 3 an optical recording layer, 6 a film coating layer, 4a a fixing layer and 5 a protective substrate.

Figure 2:
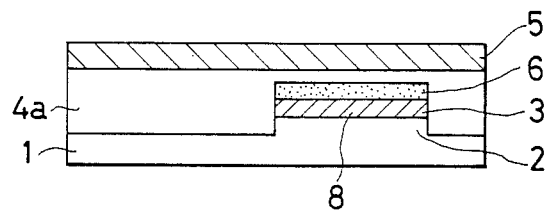
FIG. 2 is a sectional view of one embodiment of the optical information recording carrier according to the present invention.

As shown in FIG. 1 and FIG. 2, the optical recording carrier of the present invention comprises an optical recording layer consisting of, for example, an organic dye thin film provided on the track groove portion 2 on the transparent substrate 1 having a track groove, said optical recording layer 3 being coated on the effective recording portion 8 with a film coating layer such as a resin thin film, etc. begin further laminated thereon with the fixing layer 4a comprising an adhesive, etc. to be adhered with the protective substrate 5, thereby fixing the film coating layer 6 onto the optical recording layer 3.

The optical recording carrier of the present invention may have the optical recording layer 3 coated and fixed with the coating layer 6, and the protective substrate 5 may be optionally present.

The film coating layer 6 in the present invention is a resin thin film, and is required to be made of a material which is not substantially changed under at least the unrecorded state of the optical recording layer at the contacted interface with the above recording layer, and should desirably prevent influence of the adhesive used in the fixing layer on the optical recording layer. Also, it should desirably be readily deformed by the heat energy which is considered to be generated by light-→heat conversion in the optical recording layer of irradiated energy. Thus, together with the effect of microscopic space layer between the optical recording layer and the film coating layer, recording contrast and recording sensitivity is improved without interfering with pit formation by physical deformation of the optical recording layer.

In this respect, a thermoplastic resin thin film is preferred as the film coating layer. For example, these may include acrylic resins, polyester type resins, polycarbonate resins, vinyl type resins, polysulfone resins, polyimide type resins, polyacetal resins, polyolefin resins, polyamide resins, vinylidene resins, cellulose derivatives or copolymers of these such as vinyl chloride-vinyl acetate copolymer, ethylene-vinyl acetate copolymer, ethylene-acrylate copolymer, vinyl acetate-acrylate copolymer, styrene-butadiene copolymer, etc.

Among them, polyester resins, particularly polyethyleneterephthalate, are preferred.

Further, of the materials available for the protective material 5 such as sheet-shaped resins, metal thin films, etc., those which satisfy the above conditions all can be utilized.

Also, adhesives which satisfy the above conditions may be used. This means multiple use of the adhesive to be used in the fixing layer and, for example, a sheet-shaped thermoplastic adhesive also can be used for the film coating layer 6.

The above resin thin films are readily available in shape of film, with a variety of thicknesses from several $\mu$m. Its shape should be preferably smooth.

Smoothness of the surface affects the recording characteristic of the optical recording layer 3 of the optical recording carrier. In the case of poor smoothness, S/N ratio is bad, whereby sufficient signal detection can be done only with difficulty. For detecting signals by transmittance change, the film should be desirably transparent to the reproducing light. In the case of detecting signals by reflectance change, there is no limitation with respect to the reproducing light employed.

The film thickness of the film coating layer may differ depending on the material employed, but it is desired to be generally 0.05 to 100 $\mu$m, preferably 0.1 to 50 $\mu$m.

When the film coating layer is coated with the fixing layer 4a, for improvement of closeness and adhesiveness at the interface between the both layers, the surface of the resin thin film constituting the film coating layer 6 may be modified only on one surface. Also, a resin thin film attached with a tacky layer functioning also as the adhesive layer may be used.

The fixing layer 4a of the present invention is used for the purpose of fixing the above film coating layer 6 or as the adhesive layer for fixing the film coating layer 6 and plastering with the protective substrate 5. As the fixing layer 4a, for the purpose of fixing, a thermoplastic film with lower softening temperature or melting point than the film coating layer 6 or a thermoplastic adhesive of the dry film type can be used. As the adhesive layer, in addition to those mentioned above, thermoplastic adhesives, photocurable adhesives, curable adhesives with light and heat in combination, tacky adhesives, etc. can be used without limitation, and also a protective substrate 5 with these adhesives applied on one surface may be used and plastered. Also, the film coating layer 6 can be used as such for functioning also as the fixing layer 4a.

Next, to show specific examples of the adhesive to be used for the fixing layer 4a, there can be utilized, for example, vinyl acetate type, vinyl acetate acrylic type, vinyl acetate copolymer type, vinyl acetate emulsion type, acrylic type, acrylate type, acrylic copolymer type, ethylene type, ethylene vinyl acetate type, ethylene-vinyl acetate copolymer type, polyethylene type, methylene chloride type, polyamide type, polyamideamine type, polyimide type, urea type, epoxy type, epoxyurethane type, epoxyacrylate type, urethaneacrylate type, polyester type, chloroprene type, chloroprene rubber type, nitrile type, nitrile rubber type, urethane type, vinyl urethane type, polyurethane type, olefinic type, cyanoacrylate type, alkylacrylate type, vinyl chloride type, phenolic type, SBR type (styrene-butadiene rubber), polyol type, silica alumina type, synthetic rubber type, emulsion type, oligoester type, cellulose type, formaldehyde type, ethylene-acrylate copolymer type, vinyl acetate-acrylate copolymer type, further UV-ray curable adhesives, organic solvents, styrene-butadiene type, Freon TA type, etc. Those which require energy such as heat, light, electron beam, etc. are also useful, provided that the energy does not deteriorate the function of the optical recording material.

As the transparent substrate 1, those with little inconvenience in optical recording and reproduction, and any one with high transmittance to the light used may be useful, including acrylic resins, polyester resins, polycarbonate resins, vinyl type resins, polysulfone resins, polyimide type resin, polyacetal resins, polyolefin resins, polyamide resins, cellulose derivatives, etc.

For formation of the track groove portion on the substrate, when the substrate is a thermoplastic resin, the following method can be used. A stamper mold is thermally transferred by injection molding or hot press molding at a temperature of the melting point or higher, or by a method in which a photocurable resin composition is applied on the substrate, a stamper mold is closely contacted thereon and said photocurable resin composition is cured by irradiation of UV-ray, etc., thereby phototransferring the stamper mold, etc.

In the case of the thermal transfer method, the track portion and the transparent substrate are integrally made, while in the case of the phototransfer method, the track portion and the transparent substrate are not integral but are adhered. Alternatively, a resist film may be formed on a transparent substrate having a light-transmissitive thin film with an etchable desired thickness. Exposure is effected through a photomask having a pattern of the track groove and developed to form a resist pattern, followed by etching of said thin film with the resist pattern as the mask, whereby the track portion can be also formed on the substrate.

The width of the track groove portion may be generally 2 to 4 $\mu$m in the case of an optical card, generally around 0.8 $\mu$m in the case of an optical disc, with the track pitch being 8 $\mu$m to 15 $\mu$m in the former, and about 1.6 $\mu$m in the latter.

The depth of the groove may be preferably $\lambda/4n$ (or $\lambda/8n$) multiplied by an odd number wherein $\lambda$ is the wavelenth of the light source employed and n is the refractive index of the transparent substrate 1, for detection of tracking signals. When reproducibility of moldability of the groove portion is taken into consideration, detection of the reflected light quantity may be sometimes difficult due to the interference effect by only the phase component. In such case, the theoretical depth of groove may be sometimes altered for detection of the reflected light quantity also in view of the intensity change of the amplitude component, and therefore cannot be defined. When the optical recording layer 3 is formed on the track groove portion 2, UV-ozone treatment, plasma treatment, etc. may be applied for the purpose of improving adhesiveness, improving optical characteristics (e.g. transmittance or reflectance), improving gas barrier property to gas release from the substrate, improving thermal conductivity for storage stability of the optical recording layer or prevention of deterioration by the reproducing light.

Reflectance of the recording layer 3 should be preferably greater at the pit, etc. which is the recorded portion than at the unrecorded portion at around the wavelength of the reproducing light employed, for example, the semiconductor laser wavelength region. It is also preferable that the recording layer be one which is not changed in reflectances at the recorded portion and the unrecorded portion by the reproducing light. Further, it should preferably be one with smaller energy required for pit formation during recording.

For example, there can be employed oxides such as of Te, Sb, Mo, Ge, V, Sn, etc., compounds such as Te-Sn, TeOx-Ge, etc., complex compounds of metals with organic compounds or inorganic sulfides such as TeCh$_4$, Te-CS$_2$, Te-styrene, Sn-SO$_2$, GeS-Sn, SnS-S, etc., thermoplastic resins such as nitrocellulose, polystyrene, polyethylene, etc. containing metal particles such as silver, etc. dispersed therein, such thermoplastic resins having metal particles agglomerated on the surface thereof, chalcogenides or chromogenic type MoO$_3$-Cu, MoO$_3$-Sn-Cu, etc. Particularly, improvement in effect of the recording contrast is marked when an organic dye capable of undergoing optical physical change is used. This is because, when the recording layer in the optical information recording carrier of the close contact encapsulation type of the prior art comprises an organic dye film capable of undergoing physical change, it is susceptible to the action of inhibiting pit formation by the upper layer of the recording layer, for example, a protective substrate.

As the organic dye to be used in the organic thin film, there may included, for example, anthraquinone derivatives (particularly those having indanthrene skelton), dioxazine compound and derivatives thereof, triphenodithiazine compounds, phenanthrene derivatives, cyanine compounds, melocyanine compounds, pyrilium type compounds, xanthene type compounds, triphenylmethane type compounds, croconium type dyes, azo dyes, crocones, azines, indigoids, polymethine type dyes, azulenes, squarilium derivatives, sulfide dyes and dithiolate complexes of metals, etc.

Also, there may be employed dye compositions in which those which are quenching agents for the excited species of these dyes are mixed with these dyes. For example, the quenching agent may be selected from those as mentioned below in view of compatibility with the dye and the solvent. The amount added can vary from several % by weight to 50% by weight. If it is too small, no considerable effect as the quenching agent can be seen, while if added in an amount over 50% by weight, reduction in sensitivity is observed due to lowering in the absolute amount of the heat mode recording material. Accordingly, an amount of 10% by weight to 30% by weight based on the dye is preferred. Particularly, high effect without accompaniment of deterioration in sensitivity can be obtained from around 20% by weight.

As such quenching agent, there may be included various metal chelate compounds, particularly comprising multi-dentate ligands with Zn, Cu, Ni, Cr, Co, Mn, Pd, Zr as the center atom, for example, tetradentate ligands such as N$_4$, N$_2$O$_2$, N$_2$S$_2$, S$_4$, O$_2$S$_2$, O$_4$, etc., or tridentate ligands such as N$_2$O, NO$_2$, NS$_2$, O$_3$, NOS, etc. and other ligand such as water, ammonia, halogen, phosphine, amine, arsine, olefin, etc., or the tetradentate type with two bidentate ligands N$_2$, NO, O$_2$, S$_2$, otherwise biscyclopentadienyl ligand, cyclopentadienyl-tropyrinium ligand system, or those comprising combinations of the above ligands, and otherwise various aromatic amines or diamines, nitrogen-containing aromatic compounds and onium salts thereof, such as aminium salts, diimonium salts, pyridinium salts, imidazolinium salts, quinolinium salts, etc. Further, pyrylium salts which are salts of oxygen-containing aromatic compounds, etc. may be also used. Also, it is possible to use a plural number of these quenching agents in combination, and the composition ratios can be suitably varied in view of coatability of the dye composition, stability of the coated film, optical characteristics (reflectance and transmittance), recording sensitivity, etc.

The optical recording layer 3 comprising the above organic dye or dye composition may be formed according to the known coating method. For example, there may be employed such method as dip coating, spray coating, spinner coating, bar coating, blade coating, roll coating, curtain coating, etc. The thickness of the optical recording layer 3 may be generally about 500 to 2000 Å, preferably around 1000 Å. Particularly, with respect to recording sensitivity, the thickness should be preferably thinner, while it is preferably thicker with respect to the S/N ratio during reproduction, and its optimum film thickness may differ depending on the kind of the dye.

As the protective substrate 5, all materials available as conventional protective substrate can be used, including specifically polyvinyl chloride, fluorine-substituted ethylene polymer, vinyl chloridevinyl acetate copolymer, polyvinylidene chloride, acrylic polymers such as polymethyl methacrylate, polystyrene, polyvinyl butyral, acetyl cellulose, styrene-butadiene copolymer, polyethylene, polypropylene, polycarbonate, epoxyacrylonitrile-butadiene-styrene copolymer, etc.

In some cases, a diversity of materials can be used depending on the uses, including metal sheets of iron, stainless steel, aluminum, tin, copper, zinc, etc., synthetic paper, paper, fiber-reinforced plastic, composite materials of metal powder such as magnetic material with plastic, ceramics, etc. Of course, those used for the transparent substrate 1 may be used.

Figure 3:
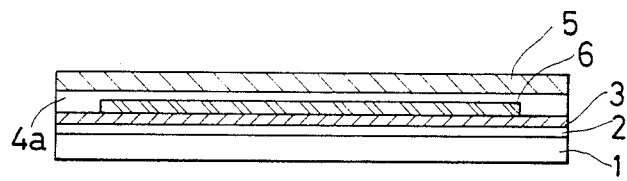
FIG. 3, FIG. 4 and FIG. 5 are respectively a sectional view, a plan view showing another embodiment of the optical information recording carrier according to the present invention, and a schematic constitutional view of its reproduction method.
Figure 4:
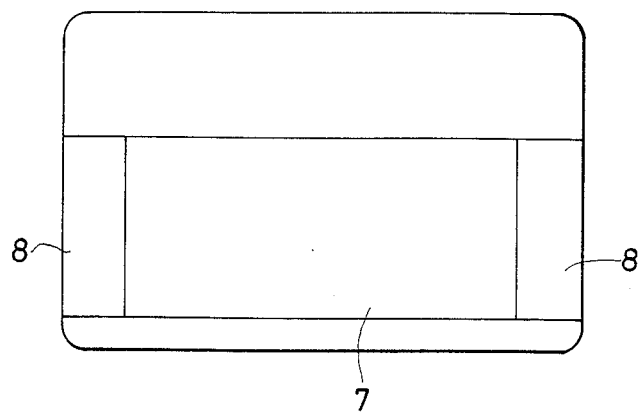
Figure 5:
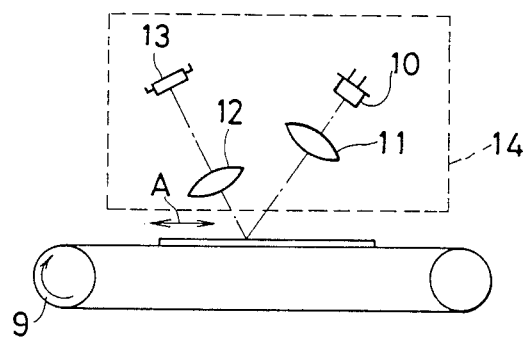
Figure 6:
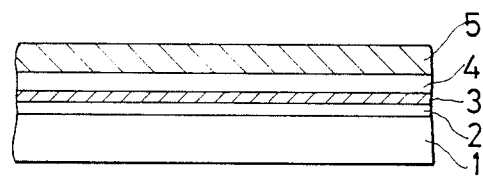
FIG. 6 is a schematic sectional view of an optical information recording carrier of the closely contacted encapsulation type of the prior art.
Figure 1:
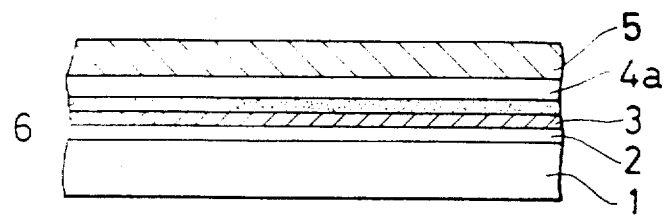
Figure 2:
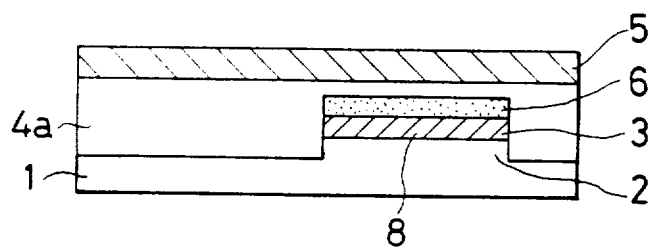
Figure 3:
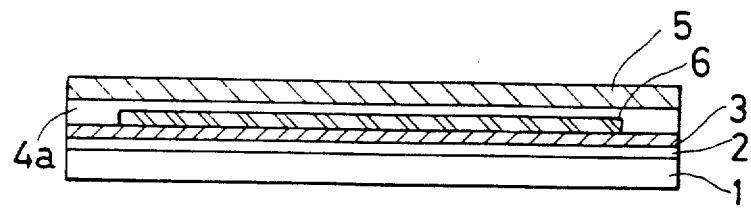
Figure 4:
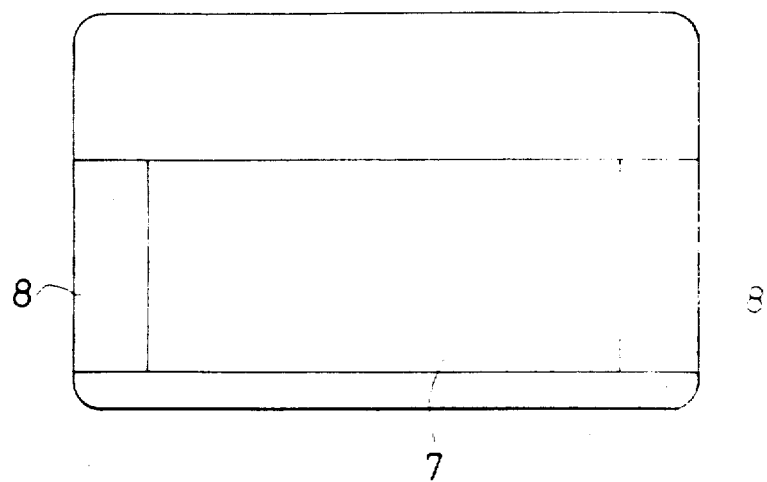
Figure 5:
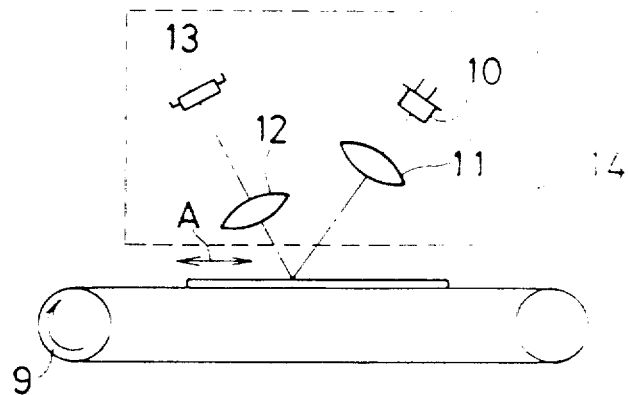
Figure 6:
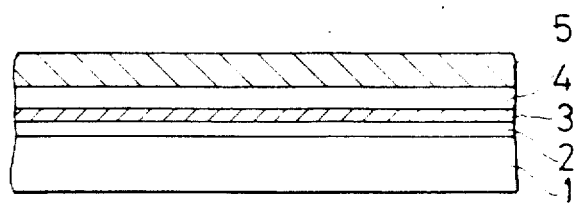

Next, another embodiment of the optical recording carrier according to the present invention is shown in FIG. 3 and FIG. 4. In FIG. 3, the film coating layer covers the optical recording layer effective portion 7 of the optical recording layer 3, namely the recording region. In this case, the portion of the recording layer other than the recording region is penetrated with the adhesive used for the fixing layer, and further formed into a completely adhered structure, whereby the recording sensitivity is lowered but the recording region portion has ordinary recording density, as optimum for the construction of an optical recording carrier shaped in a card (hereinafter called optical card). More specifically, as shown in FIG. 5, the optical card moves toward arrowhead A by the rotating mechanism 9 when tracking is performed during reproduction to read the information, but the optical card will stop temporarily after completion toward the A direction before movement toward the opposite direction, whereby writing proceeds with the energy of the reproducing light at that portion, namely the marginal portion, although extremely gradually, until reaching the state where the tracking signal can be detected with difficulty, as is well known in the art. Accordingly, it is desirable that the marginal portion 8 should be lower in recording sensitivity and the tracking signal can be read.

Here, if an optical card with the above constitution is used, due to low recording sensitivity at the portion other than the recording region, writing with the reproducing light at the time of temporary stopping can be prevented, and further the tracking signal can be read.

Also, in this embodiment, it is particularly preferred to provide a track groove by use of the 2P method.

More specifically, when a track groove is formed on a substrate according to the 2P method, namely the method in which a photocurable resin composition is coated on a substrate, a stamper mold is closely contacted thereon and said photocurable resin composition is cured by irradiation of UV-ray, etc., the track groove portion is not integrated with the substrate, but it is a laminated structure. Thus, since the track portion comprises a photocured resin, even with an extremely thin layer of several $\mu$m to some 100 $\mu$m, it has been observed that the characteristics of a cured resin tend to be exhibited strongly. For this reason, in the case of an optical information recording carier, pit formation due to physical change such as melting, sublimation, etc. of the optical recording layer can be inhibited greatly, whereby the recording sensitivity becomes very low. However, by providing a film coating layer on the recording region portion 7, the recording sensitivity can be restored at the recording region portion 7, whereby recording can be effected with good sensitivity in the recording region, while recording sensitivity is very low at the marginal portion to give rise to substantially no deterioration with the reproducing light.

Also, the film coating layer 6 has been found to be good in thermostat humidistat durability as compared with the optical recording carrier of a hollow structure. This may be considered to be due to the fact that the film coating layer 6 also functions as the protective layer for the optical recording layer, whereby no deterioration of the recording layer occurs due to oxygen, moisture, etc. remaining at the hollow portion of the optical recording carrier of a hollow structure.

As described above, according to the present invention, an optical information recording medium of the closely contacted encapsulation type with a simple constitution improved in recording sensitivity and recording contrast can be obtained.

The present invention is described below in more detail by referring to Examples.

EXAMPLE 1

On a transparent resin substrate (75 mm × 90 mm × 0.4 mm, a polycarbonate plate containing UV-ray absorber, trade name: Panlite, produced by Teijin Kagaku), a track groove was formed according to the 2P molding method by use of a photocurable resin mixture comprising neopentyl glycol diacrylate (70 parts by weiht), a bisphenol type epoxy acrylate (30 parts by weight) (bifunctional acrylate having acrylic acid added on Epikote (trade name) produced by Yuka Shell Epoxy) and benzoin isopropyl ether (1 part by weight). A substrate for optical card comprising a stripeshaped track groove with a track groove of 3 $\mu$m, a track groove pitch of 13 $\mu$m and a track depth of 1300 Å. Said substrate for optical card was dried at 120° C. for 3 hours to remove residual monomers and complete the polymerization, and Colcoat 103X (produced by Colcoat) was applied as the subbing layer by the spin coating method, followed by drying at 50° C. for 3 hours to form a silica thin film of 500 Å. On the subbing layer, a solution of a dye of the formula (I) shown below dissolved to 6% by weight in dichloroethane was applied by the spin coating method to form an optical recording layer with a thickness of 1000 Å.

On the recording layer, a polyethylene-terephthalate shaped in a strip with a thickness of 5 μm (Lumirror, produced by Toray K.K.) was superposed and further a thermoplastic adhesive (ethylene-vinyl acetate type dry film) with a thickness of 50 μm superposed thereon, and a white polycarbonate of 0.3 mm (Toughlon, produced by Idemitsu Sekiyu Kagaku K.K.) was superposed as the opaque card substrate, followed by hot pressurization with hot rolls with a surface temperature of 110° C. to prepare an optical card.

Next, when recording was performed from the transparent substrate side of the optical card with a writing pulse width of 100 μs by use of a semiconductor laser beam of 830 nm under the conditions of a power of laser beam of 3.9 mW, a spot diameter of 4.5 μmφ and a card delivery speed of 60 mm/s, a contrast ratio of 0.65 was obtained. Here, the contrast ratio represents a ratio of the reflectance at the non-recorded portion relative to the value of the reflectance at the non-recorded portion from which the reflectance at the recorded portion is detracted.

ness) with a diameter of 130 mm and an inner diameter of 15 mm was pressure adhered and laminated at normal temperature to obtain an optical disc of the close contact encapsulation type.

When recording was performed from the transparent substrate side of the optical disc by use of a semiconductor laser beam of 830 nm, under the conditions of a laser beam power of 8 mW, a recording frequency of 2 MHz and a rotational number of 1,800 rpm, a contrast ratio of 0.75 was obtained.

When the C/N value of reflectance was measured by carrying out the storage acceleration test by leaving the optical disc applied with optical recording under the conditions of 60° C. and 90% (relative humidity) for 1000 hours, the C/N value was found to be 51 dB.

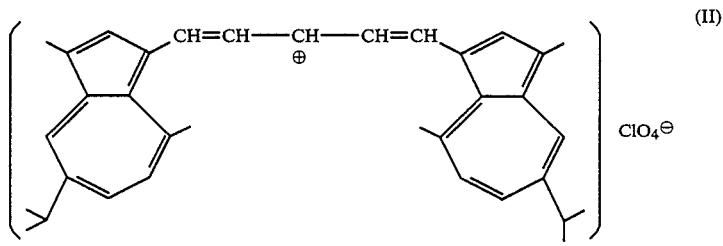

(II)

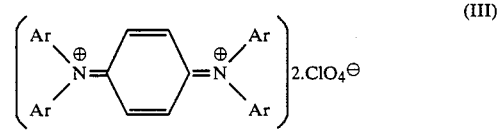

(III)

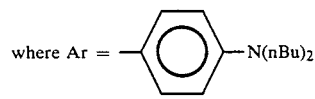

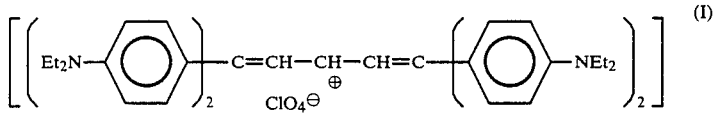

(I)

COMPARATIVE EXAMPLE 1

When an optical card was prepared in entirely the same manner as in Example 1 except for omitting a 5 μm polyethylene-terephthalate which was the film coating layer, only a contrast ratio of 0.22 could be obtained.

EXAMPLE 2

According to the injection molding method, a subbing layer comprising a silica thin film with a thickness of 200 Å was formed by spin coating of Colcoat 103X (produced by Colcoat) on an acrylic disc substrate (diameter 130 mm, inner diameter 15 mm) grooved with a track groove of 0.8 μm, a track pitch of 1.6 μm and a track groove depth of 600 Å.

On the subbing layer was formed an optical recording layer with a thickness of 900 Å by coating of a 2% by weight of a dichloroethane solution of a dye of the formula (II) shown below added with 20% by weight based on the dye of N,N,N',N'-tetrakis(p-di-n-butylaminophenyl)-p-phenylenediimmonium perchlorate (the formula (III)) as the quenching agent.

On the optical recording layer was placed a polyester film shaped in a ring band with a diameter of 125 mm, an inner diameter of 30 mm and a thickness of 5 μm (trade name: Tetron F, produced by Teijin Kasei), and further a tackifier-attached triacetate film (70 μm thick-

COMPARATIVE EXAMPLE 2

An optical disc was prepared in entirely the same manner as in Example 2 except for omitting the 5 μm polyester film which was the film coating layer. As the result, the tackifier appeared to have reacted with the optical recording layer, whereby reflectance was lowered to make recording impossible.

COMPARATIVE EXAMPLE 3

A disc substrate was prepared in entirely the same manner as in Example 2 to the step of forming the optical recording layer. At the innerside of the outer peripheral portion and the outerside of the inner portion of a disc-shaped acrylic substrate (diameter 130 mm, inner diameter 15 mm), respectively, a UV-curable adhesive having styrene-divinylbenzene resin beads with particle size of 300 μm dispersed therein in ring bands of 2 mm in width and, with the disc substrate attached with the optical recording layer superposed thereon, UV-ray was irradiated with the portion corresponding to the optical recording layer intercepted from light to cure the ring bands, to prepare an optical disc having a space layer.

After the optical disc was recorded under the recording conditions shown in Example 2, storage acceleration test was conducted by leaving the recorded disc to stand under the conditions of 60° C., 90% (relative humidity) for 1000 hours. The C/N value of reflectance was measured to be lowered as 39 dB.

EXAMPLE 3

An optical disk was manufactured by the same manner as in Example 2 except that a thermoplastic dry film (ethylene-vinyl acetate type, thickness of 50 μm) with a release paper used in place of a triacetate film (thickness of 70 μm) on which an adhesive is coated was laminated by a thermocompression bonding at 110° C., and the release paper was peeled. A contrast ration was 0.72.

COMPARATIVE EXAMPLE 4

When an optical card was prepared in entirely the same manner as in Example 3 except for omitting a 5 μm polyester film which was the film coating layer, only a contrast ratio of 0.28 could be obtained.

EXAMPLE 4

By use of a transparent polycarbonate substrate with a thickness of 400 μm provided with a track groove portion with a track groove of 2.0 μm, a track pitch of 12.0 μm and a track depth of 2500 Å as the transparent substrate, the track groove portion was coated by bar coating with a dye having the structure of the following formula (IV) to form an optical recording layer with a film thickness of 0.1 μm.

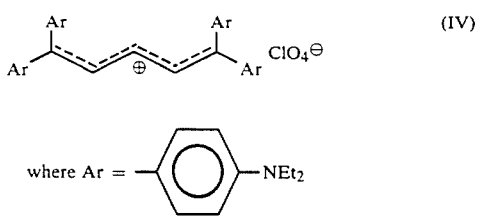

At this point, reflectance of the light at 830 nm at the interface between the groove portion of polycarbonate and the dye layer was measured from the polycarbonate side to be 15%.

Next, the effective portion of the optical layer formed on the track groove portion, namely the recording region was covered with a 5 μm polyethyleneterephthalate film, and a polycarbonate with a thickness of 300 μm was adhered onto the protective substrate by use of a polyamide type adhesive to prepare a card, whereby reflectance of light of 15% and sufficient adhesion strength could be obtained. The contrast was found to be 0.78.

COMPARATIVE EXAMPLE 5

A card-shaped optical recording medium was prepared in entirely the same manner as in Example 4 except for omitting the 5 μm polyethyleneterephthalate film which was the film coating layer and using a ethylene-vinyl acetate adhesive.

At this time, the reflectance of the light at 830 nm was 15%, but the adhesive strength between the grooved polycarbonate and the polycarbonate as the card substrate was low. The contrast ratio was found to be 0.61.

COMPARATIVE EXAMPLE 6

An optical card was prepared in entirely the same manner as in Example 4 except for omitting the 5 μm polyethyleneterephthalate film which was the film coating layer and using a polyamide type adhesive.

At this time, the adhesive strength was high. However, the reflectance of the light at 830 nm was lowered to make recording impossible.

EXAMPLE 5

On a transparent resin substrate (75 mm × 90 mm × 0.4 mm, a polycarbonate plate containing UV-ray absorber, trade name: Panlite 211, produced by Teijin Kagaku), a track groove was formed according to the 2P molding method by use of a photocurable resin mixture comprising neopentyl glycol diacrylate (70 parts by weiht), a bisphenol type epoxy acrylate (30 parts by weight) (bifunctional acrylate having acrylic acid added on Epikote (trade name) produced by Yuka Shell Epoxy) and benzoin isopropyl ether (1 part by weight). A substrate for optical card comprising a stripe-shaped track groove with a track groove of 3 μm, a track groove pitch of 13 μm and a track depth of 1300 Å.

Said substrate for optical card was dried at 120° C. for 3 hours to remove residual monomers and complete the polymerization, and Colcoat 103X (produced by Colcoat) was applied as the subbing layer by the spin coating method, followed by drying at 50° C. for 3 hours to form a silica thin film of 500 Å. On the subbing layer, a solution of a dye of the formula (V) shown below dissolved to 1.6% by weight in dichloroethane was applied by the spin coating method to form an optical recording layer with a thickness of 1000 Å.

With a polyethyleneterephthalate [Hostaphane RE-5, produced by Hoechst K.K.] with a size corresponding to the recording region (35 mm in shorter length direction, 40 mm in longer direction direction) with a thickness of 5 μm superposed on the optical recording layer, followed further by superposition of a thermoplastic adhesive (Evaflex type dry film) with a thickness of 50 μm, a polycarbonate with a thickness of 0.3 mm was placed as the card substrate and hot pressure adhered by hot rolls with a surface temperature of 110° C. to prepare an optical card.

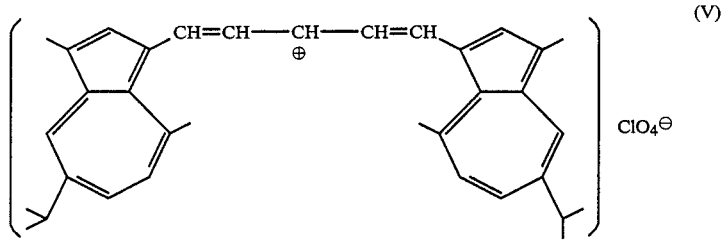 (V)

Next, when recording was performed from the transparent substrate side of the optical card by use of a semiconductor laser beam of 830 nm under the conditions of a power of laser beam of 3.9 mW, a spot diameter of 4.5 μmφ and a card delivery speed of 60 mm/s, a contrast ratio of 0.57 was obtained.

On the other hand, the contrast ratio at the marginal portion was found to be 0.2 or less, thus giving substantially low value as the recording contrast ratio. Here, the contrast ratio represents a ratio of the reflectance at the non-recorded portion relative to the value of the reflectance at the non-recorded portion from which the reflectance at the recorded portion is detracted.

When the optical card was subjected to repeated reproduction on one recorded track under the conditions of a card delivery speed of 60 mm/s and a reproducing light power of 0.4 mW, no deterioration was seen in the tracking signals at the marginal portion even when reciprocated for 30,000 times. Also, when the optical head was reciprocated for 10,000 times in the shorter direction of the optical card at a speed of 30 mm/s, no writing with the reproducing light at the marginal portion could be detected.

What is claimed is:

1. A closely contacted encapsulation optical information recording carrier comprising an optical recording layer provided on a transparent substrate, film coating layer laminated without adhesion to provide a microscopic space layer on said optical recording layer, and further a fixing layer laminated thereon to fix said film coating layer.

2. An optical information recording carrier according to claim 1, wherein recording on said information recording carrier is effected by formation of a pit by change in shape.

3. An optical information recording carrier according to claim 1, wherein said transparent substrate has a track groove.

4. An optical information recording carrier according to claim 3, wherein said track groove is an optically cured transferred product of a photopolymerizable resin composition laminated on said transparent substrate.

5. An optical information recording carrier according to claim 1, wherein said optical recording layer comprises an organic dye film.

6. An optical information recording carrier according to claim 1, wherein said film coating layer is composed of a thermoplastic resin.

7. An optical information recording carrier according to claim 6, wherein said thermoplastic resin is a polyester resin.

8. An optical information recording carrier according to claim 7, wherein said polyester resin is polyethyleneterephthalate.

9. An optical information recording carrier according to claim 1, wherein said film coating layer has a thickness of 0.05 μm to 100 μm.

10. An optical information recording carrier according to claim 9, wherein said film coating layer has a thickness of 0.1 μm to 50 μm.

11. An optical information recording carrier according to claim 1, wherein said film coating layer is laminated only in the recording region.

12. An optical information recording carrier according to claim 1, wherein said optical recording information recording carrier is in shape of a card.

13. An optical information recording carrier according to claim 12, wherein said optical recording information recording carrier is in shape of a card and no recording region is provided at both ends thereof.

14. An optical information recording carrier according to claim 1, wherein said fixing layer is an adhesive layer.

* * * * *

UNITED STATES PATENT AND TRADEMARK OFFICE
CERTIFICATE OF CORRECTION

PATENT NO. : 4,871,601                                    Page 1 of 5

DATED      : October 03, 1989

INVENTOR(S) : Kyo Miura, et al

It is certified that error appears in the above-identified patent and that said Letters Patent is hereby corrected as shown below:

The sheets of drawings, consisting of Figs. 1-6, should be added as shown on the attached sheets.

Title page, "1 Drawing Sheet" should be -- 2 Drawing sheets --

UNITED STATES PATENT AND TRADEMARK OFFICE
CERTIFICATE OF CORRECTION

PATENT NO. : 4,871,601
DATED : October 3, 1989
INVENTOR(S) : KYO MIURA, ET AL.

It is certified that error appears in the above-identified patent and that said Letters Patent is hereby corrected as shown below:

COLUMN 1

Line 34, "informations" should read --information--.
    Line 56, "obtained" should be deleted.

COLUMN 2

Line 35, "optical information recording center" should read --optical information recording carrier--.

COLUMN 4

Line 12, "to" should be deleted.
    Line 13, "be used" should be deleted.

COLUMN 5

Line 34, "missitive" should read --missive--.
    Line 47, "wavelenth" should read --wavelength--.

COLUMN 7

Line 50, "as" should read --and is--.
    Line 51, "construction" should read --constitution--.

UNITED STATES PATENT AND TRADEMARK OFFICE
CERTIFICATE OF CORRECTION

PATENT NO. : 4,871,601
DATED : October 3, 1989
INVENTOR(S) : KYO MIURA, ET AL.

It is certified that error appears in the above-identified patent and that said Letters Patent is hereby corrected as shown below:

COLUMN 8

Line 18, "carier" should read --carrier--.
Line 53, "weiht)," should read --weight),--.

COLUMN 11

Line 14, "disk" should read --disc--.

COLUMN 12

Line 34, "weiht)," should read --weight),--.
Line 59, "longer direction direction)" should read --longer length direction)--.

COLUMN 13

Line 43, "film coating" should read --a film coating--.

Signed and Sealed this

Ninth Day of April, 1991

Attest:

HARRY F. MANBECK, JR.

*Attesting Officer*    *Commissioner of Patents and Trademarks*